US010253682B2

(12) United States Patent
Lenk et al.

(10) Patent No.: US 10,253,682 B2
(45) Date of Patent: Apr. 9, 2019

(54) ELECTROMAGNETIC VALVE FOR AN INTERNAL COMBUSTION ENGINE

(71) Applicant: PIERBURG GMBH, Neuss (DE)

(72) Inventors: Martin Lenk, Neuss (DE); Oliver Paul, Gelsenkirchen (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 15/511,644

(22) PCT Filed: Aug. 25, 2015

(86) PCT No.: PCT/EP2015/069419
§ 371 (c)(1),
(2) Date: Mar. 16, 2017

(87) PCT Pub. No.: WO2016/041743
PCT Pub. Date: Mar. 24, 2016

(65) Prior Publication Data
US 2017/0306866 A1     Oct. 26, 2017

(30) Foreign Application Priority Data

Sep. 19, 2014 (DE) .................. 10 2014 113 566

(51) Int. Cl.
*H01F 7/16* (2006.01)
*F02B 37/18* (2006.01)
(Continued)

(52) U.S. Cl.
CPC .......... *F02B 37/186* (2013.01); *F02B 37/16* (2013.01); *F16K 27/029* (2013.01);
(Continued)

(58) Field of Classification Search
CPC .............. F16K 27/029; F16K 31/0655; F16K 31/0693; F02B 37/186; F02B 37/16
See application file for complete search history.

(56) References Cited

U.S. PATENT DOCUMENTS 2,856,569 A * 10/1958 Birge .................. F16K 31/0675
335/245
4,683,453 A * 7/1987 Vollmer ................ H01F 7/1607
335/255
(Continued)

FOREIGN PATENT DOCUMENTS

CN        1118026 A       3/1996
CN      103177844 A       6/2013
(Continued)

OTHER PUBLICATIONS

PCT/EP2015/069419 Form PCT/ISA/210, dated Oct. 16, 2015.*

*Primary Examiner* — Eric Keasel
(74) *Attorney, Agent, or Firm* — Norman B. Thot

(57) ABSTRACT

An electromagnetic valve for an internal combustion engine includes a housing, an electromagnetic actuator arranged in the housing, the electromagnetic actuator having an electromagnetic armature and a core, a control element which is arranged to protrude axially out of the housing and which is connected to the electromagnetic armature so as to form a movable unit together therewith, the movable unit having a radial recess, and an arrangement which delimits an axial movement of the movable unit away from the core of the electromagnetic actuator. The arrangement includes at least one hook arranged on the housing. The at least one hook engages into the radial recess of the movable unit.

9 Claims, 1 Drawing Sheet

(51) Int. Cl.
  *F02B 37/16* (2006.01)
  *F16K 31/06* (2006.01)
  *H01F 7/127* (2006.01)
  *F16K 27/02* (2006.01)
(52) U.S. Cl.
  CPC ...... *F16K 31/0655* (2013.01); *F16K 31/0693* (2013.01); *H01F 7/127* (2013.01); *H01F 7/1607* (2013.01); *Y02T 10/144* (2013.01)

(56) References Cited

U.S. PATENT DOCUMENTS

| | | | |
|---|---|---|---|
| 5,503,362 A * | 4/1996 | Kim | F16K 31/404 251/30.03 |
| 6,405,755 B1 | 6/2002 | Doehla et al. | |
| 2004/0178377 A1 | 9/2004 | Schempp et al. | |
| 2005/0098400 A1 | 5/2005 | Kleinert et al. | |
| 2009/0301081 A1 | 12/2009 | Thiery et al. | |
| 2013/0147584 A1 | 6/2013 | Ocket et al. | |

FOREIGN PATENT DOCUMENTS

| | | |
|---|---|---|
| DE | 197 49 641 A1 | 5/1999 |
| DE | 103 47 667 A1 | 4/2004 |
| DE | 10 2004 044 439 B4 | 4/2006 |
| EP | 1 941 138 A1 | 7/2008 |
| EP | 1 941 138 B1 | 3/2010 |
| EP | 2 605 254 A1 | 6/2013 |
| JP | 63-142487 U | 9/1988 |
| JP | 2000-161522 A | 6/2000 |
| JP | 2002-531787 A | 9/2002 |
| JP | 2002-289426 A | 10/2002 |
| JP | 2004-183681 A | 7/2004 |
| JP | 2013-83339 A | 5/2013 |
| JP | 2014-47800 A | 3/2014 |
| WO | WO 02/091404 A1 | 11/2002 |
| WO | WO 2014/068765 A1 | 5/2014 |

* cited by examiner

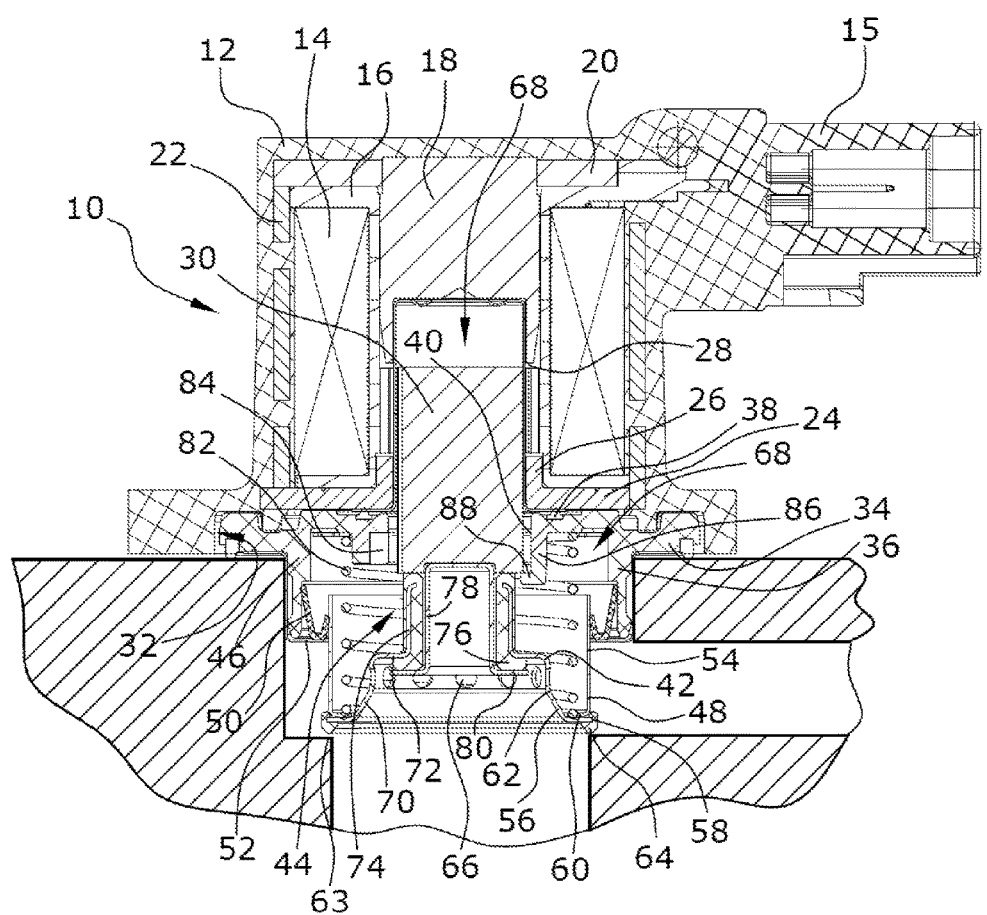

ELECTROMAGNETIC VALVE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2015/069419, filed on Aug. 25, 2015 and which claims benefit to German Patent Application No. 10 2014 113 566.0, filed on Sep. 19, 2014. The International Application was published in German on Mar. 24, 2016 as WO 2016/041743 A1 under PCT Article 21 (2).

FIELD

The present invention relates to electromagnetic valves for internal combustion engines, comprising a housing, an electromagnetic actuator which is arranged in the housing, a movable control element which protrudes axially out of the housing and is connected to the armature of the actuator and which forms a movable unit together with the armature, and an arrangement which delimits an axial movement of the movable unit away from a core of the actuator.

BACKGROUND

Such electromagnetic valves are needed for various purposes in internal combustion engines. An example of such a valve is an electromagnetically actuated recirculation air valve for the recirculation of compressed fresh gas, possibly with recirculated exhaust gas, from the pressure side of a compressor of a turbocharger back to the suction side of the compressor. The connection between the pressure side and the suction side of the compressor obtained by a bypass line is required for the transition from a high load to the propulsion operation of the internal combustion engine to prevent a high delivery by the turbocharger pump against a closed throttle valve, to prevent the resulting pumping effect, and to prevent an excessively sudden drop of the turbo speed with resulting thermodynamic problems.

The valve seat is typically formed in the bypass line which is mounted to the turbocharger housing. The control element is therefore passed onto the valve seat through the corresponding opening in the bypass line, after which the actuator is screwed to the housing of the bypass channel. Care must be taken with these valves, however, that the unit formed by the armature and the control element does not first drop out of the actuator. This makes assembly and transport significantly more difficult. It is therefore desirable for the valve to be inserted into the flow housing in a completely pre-assembled state and be there fastened.

An electromagnetic valve is described in DE 197 49 641 A1 where, for transportation purposes, an additional protective cap is slipped over the control element formed by sleeves and sealing rings. The additional protective cap must be removed prior to assembly so that, during assembly, care must still be taken so that the components of the control unit remain correctly positioned with respect to each other.

A recirculation air valve is described in DE 10 2004 044 439 B4 where an outward directed seal is arranged on the control element. The outward directed seal rests on a housing part so that the control element with the armature cannot slide out of the housing. The seal is, however, thereby subjected to mechanical stress which may result in damage to the sealing ring and leakages during operation.

A similar problem also exists with a recirculation air valve as described in EP 1 941 138 B1. The closing body is here provided with an annular enlargement in the region directed to the actuator where the annular enlargement, prior to the assembly of the valve, rests against a sealing ring of a V-shaped cross section. The unit formed by the armature and the control element in this embodiment is also prevented from dropping out by the seal, which could thereby be damaged.

SUMMARY

An aspect of the present invention is to provide an electromagnetic valve in which the armature/control element unit is reliably prevented from dropping out during transport and assembly of the valve into an opening of a channel while at the same time preventing damage to a seal which seals the control element in the closed state. A further aspect of the present invention is that no additional components should be used to achieve this aspect.

In an embodiment, the present invention provides an electromagnetic valve for an internal combustion engine which includes a housing, an electromagnetic actuator arranged in the housing, the electromagnetic actuator comprising an electromagnetic armature and a core, a control element which is arranged to protrude axially out of the housing and which is connected to the electromagnetic armature so as to form a movable unit together therewith, the movable unit comprising a radial recess, and an arrangement configured to delimit an axial movement of the movable unit away from the core of the electromagnetic actuator. The arrangement comprises at least one hook arranged on the housing. The at least one hook is configured to engage into the radial recess of the movable unit.

BRIEF DESCRIPTION OF THE DRAWINGS

The present invention is described in greater detail below on the basis of embodiments and of the drawings in which:
FIG. 1 shows the recirculation air valve of the present invention.

DETAILED DESCRIPTION

Because the arrangement for limiting axial movement of the movable unit is formed by at least one hook arranged on the housing, which hook engages into a recess in the movable unit, a load on the seal between the housing and the control element is excluded during transport. No additional components to be mounted are further required.

In an embodiment of the present invention, the at least one hook can, for example, be formed integrally with one housing part of the housing. The hook can accordingly be manufactured simultaneously with the housing part in one process step so that additional assembling and manufacturing steps can be omitted.

The housing can advantageously have an actuator housing part and a connection housing part, the hook being formed on the connection housing part. This connection housing part serves to receive the control element during operation and can be made by a simple plastic molding.

The hook can, for example, extend from the radial inner edge of the connection housing part in the region penetrated by the armature. This position is particularly suitable since the hook is arranged close to the moving unit and may thus be small in size.

In an embodiment of the present invention, the distance of one hook end to the center axis of the armature can, for example, be less that the radius of the armature. The hook is consequently adapted to engage behind the armature and thus exerts its retaining force on the solid armature so that damage to other components can be reliably avoided.

It can further be advantageous if the axial distance of the hook from the core is at least as great as the distance of the axial armature end averted from the core in the position in which the control element rests on a valve seat. It is thereby provided that the hook does not interfere with the closure of the channel to be controlled, but rests only on the armature when a larger axial movement occurs than during operation of the valve.

In an embodiment of the present invention, the axial height of the recess can, for example, be at least as large as the displacement path of the armature plus the axial dimension of the hook and the distance of the hook from the armature in the position of the control element resting on the valve seat. An entirely free movement of the armature and the control element is thereby possible during operation.

In an embodiment of the present invention, the recess can, for example, extend in the control element at the axial armature end averted from the core. The armature can thus be made, as is usual, as a substantially cylindrical body against which the hook abuts from below during transport. Providing a corresponding recess in the control element is a simple design task.

In an embodiment of the present invention, the control element can, for example, have an inner hollow body and a substantially cylindrical hollow body fastened thereto, with the recess being formed in an axial section of the inner hollow body. The channel which opens laterally of the control element can thus be closed by the entirely cylindrical hollow body, while the hook can be arranged in the inner region not flown through.

In an embodiment of the present invention, three hooks can, for example, be formed on the housing, the three hooks being distributed evenly over the circumference thereof. The armature is thus surrounded on all sides so that a tilting of the armature or the control element caused by a one-sided load is excluded.

In an embodiment of the present invention, the three hooks and their retaining elements, which are evenly distributed over the circumference, can be arranged in gaps of ring segment-shaped protrusions serving as guiding sections of a spring. A safe guiding of the spring and a transport protection are thereby obtained, while the material to be used in molding is reduced.

In an embodiment of the present invention, the at least one hook can, for example, be formed at the axial end of a guiding section for a spring. This guiding section is surrounded, for example, by a helical spring which is suitably secured against tilting or radial displacement.

An electromagnetic valve for an internal combustion engine is thus provided which comprises a reliable transport protection of the armature and the control element without the seals of the valve being stressed. A free mobility of this unit is also provided during operation. Additional assembly steps or manufacturing costs are avoided.

An embodiment of the electromagnetic valve of the present invention will be described with reference to a recirculation air valve for a compressor of an internal combustion engine and is illustrated in the drawing.

FIG. 1 illustrates a side view of a recirculating air valve of the present invention in section.

The recirculation air valve of the present invention illustrated in FIG. 1 comprises an electromagnetic actuator 10 having an actuator housing part 12 in which a coil 14 is arranged on a coil carrier 16, the coil 14 being adapted to be supplied with power via a plug 15. A magnetic core 18 is fastened in the radially inner region of the coil carrier 16 whose axial end protrudes beyond the coil carrier 16, wherein, at this axial end, the magnetic core 18 is surrounded by a first return plate 20 which is connected with a yoke 22 surrounding the coil 14. At the end of the coil carrier 16 opposite magnetic core 18, a second return plate 24 is provided which is in contact with the yoke 22 in a radially outer region and has an inner axial dimensional section 26 that extends into the coil carrier 16.

A guide sleeve 28 is arranged radially inside of the inner axial dimensional section 26, the guide sleeve 28 serving to axially guide the movement of an armature 30.

At its axial end opposite the magnetic core 18, the actuator housing part 12 has a circular recess 32 in which a basic body 34 of a connection housing part 36 is received which rests on the actuator housing part 12 with interposition of seals 38 and against which the second return plate 24 abuts, and which forms the housing of the recirculation air valve together with the actuator housing part 12.

A central opening 40 is formed in basic body 34. The armature 30 and/or a movable unit 44 of the valve, which is formed by the armature 30 and a control element 42, protrudes through the central opening 40. In the radially farther outward region, an annular housing wall 46 extends in the axial direction from the basic body 34 of the connection housing part 36, the annular housing wall 46 surrounding a cylindrical outer surface 48 of the control element 42. A leg of a seal 50 having a V-shaped cross section abuts against this annular housing wall 46, the other leg thereof resting on the cylindrical outer surface 48 so that the gap between the annular housing wall 46 and the control element 42 is sealed. Seal 50 rests on a support ring 52, which is fastened on the connection housing part 36, and is pushed against the connection housing part 36 from the side opposite the electromagnetic actuator 10 so that the annular housing wall 46 is radially surrounded by the support ring 52 and is axially delimited thereby.

The control element 42 comprises a first hollow body 54 and a second hollow body 56 arranged radially inside the first hollow body 54. The first hollow body 54 has the cylindrical outer surface 48 closed over its circumference, which has its end averted from the armature 30 formed with an annular plate 58 that extends radially inward. The second hollow body 56 has a radially outer annular plate 60 which is fastened to the annular plate 58 by welding and from the inner circumference of which a shell surface 62 extends into the inner region of the first hollow body 54. A sealing ring 64 is injection molded in the radially outer region of the radially outer annular plate 60 of the second hollow body 56, the effective diameter of the sealing ring 64 for resting on a valve seat 63 of a flow housing connected therewith corresponding substantially to the cylindrical outer surface 48 of the control element 42. The cylindrical outer surface 48 of the control element 42 is provided with openings 66 by which an inlet of the flow housing is in constant fluid communication with a housing interior 68 of the recirculation air valve, which housing interior 68 is delimited by the first hollow body 54, the connection housing part 36, and the guide sleeve 28, so that the cross sectional surface, on which the pressure in the housing interior 68 acts in the closing direction of the recirculation air valve, is equal to or slightly larger than the cross sectional surface of the control element 42 on which the pressure acts on the inlet side in the opening direction of the recirculation air valve.

The second inner hollow body 56 extends initially from the inner circumference of the plate 60 in a cylindrical shape towards the armature 30. The openings 66 are also arranged in this axial section 70. A step 72 is formed further along the second inner hollow body 56, from which step 72 the second inner hollow body 56 extends further in the axial direction with a reduced diameter. This cylindrical section 74 of the second inner hollow body 56 has a smaller diameter than the armature 30. In the region of cylindrical section 74, the second inner hollow body 56 is overmolded with an elastomer 76 which rests on the armature 30. In order to fix the control element 42 on the armature 30, a connection element 78 is used that is fastened at the axial end of the armature 30 by welding and is arranged substantially radially inside the elastomer 76. On the side opposite the armature 30, the connection element 78 has a radial enlargement 80 axially resting on the elastomer 76 whose axial end abuts against the step 72 so that the second inner hollow body 56 is fastened to the armature 30.

To furthermore provide that, if no power is supplied to the coil 14, the control element 42 is positioned in its state resting on the valve seat 63, a helical spring 82 is arranged inside the first hollow body 54, which helical spring 82 is pre-tensioned to rest on the plate 58 of the first hollow body 54 and whose opposite axial end rests on the basic body 34 of the connection housing part 36. This helical spring 82 is maintained radially in position by a guiding section 84 extending axially towards the control element 42 which is designed as three ring segment-shaped protrusions which are equally distributed over the circumference and which surround the central opening 40 of the connection housing part 36. The guiding section 84 has an outer diameter that is slightly smaller than the inner diameter of the helical spring 82 therefor.

According to the present invention, three respective retaining elements 86 extend axially from the basic body 34 in the gaps of the guiding section 84, a hook 88 being formed at the respective ends of the retaining elements 86 which extends in the direction of the cylindrical section 74. In the sense of the present invention, the cylindrical section 74 forms a recess when compared to the radial extension of the armature 30 into which the hook 88 engages. The distance of the radially inner end of the hook 88 to the center axis of the armature 30 is correspondingly smaller than the outer circumference of the armature 30. The axial movement of the armature 30 is therefore limited by the hook 88 since, in the case of a continued axial movement away from the magnetic core 18, the armature 30 abuts against the hook 88 with its end averted from the magnetic core 18. The movable unit 44 is thereby reliably secured against dropping out during assembly or transport. In order to simultaneously provide that the movement of the movable unit 44 is not hindered in the assembled state, the distance between the axial end of the armature 30 and the step 72 of the second inner hollow body 56 is chosen so that it is at least as large as the displacement path of the armature 30 plus the axial dimension of the hook 88 and the distance of the hook 88 from the armature 30 in the position of the control element 42 resting on the valve seat 63. The length of the retaining element 86 is also chosen so that the hook 88 has a short distance to the axial end of the armature 30 in the position of the control element 42 resting on the valve seat 63, i.e., that the axial distance of the hook 88 from the magnetic core 18 is at least as great as the distance of the axial end of the armature 30 averted from the magnetic core 18 in the position of the control element 42 resting on the valve seat 63.

The movable unit 44 is accordingly reliably secured during assembly and transport, whereas the displacement path can be traveled freely when the movable unit 44 is switched in operation. No additional process steps or components are required therefor.

It should be clear that the scope of protection of the present invention is not limited to the embodiment described herein. The recess may in particular be formed at another position on the armature or the control element. The hook may correspondingly be formed or attached at other positions on the housing as well. It is also conceivable to provide the recess merely in the form of a slot in the control element or to provide an optional number of hooks in order to prevent a tilting of the armature. Reference should also be had to the appended claims.

What is claimed is:

1. An electromagnetic valve for an internal combustion engine, the electromagnetic valve comprising:
   a valve seat;
   a housing comprising an actuator housing part and a connection housing part;
   an electromagnetic actuator arranged in the actuator housing part, the electromagnetic actuator comprising an electromagnetic armature and a core;
   a control element which is arranged to protrude axially out of the housing and to rest on the valve seat and which is connected to the electromagnetic armature so as to form a movable unit together therewith, the movable unit comprising a radial recess which is configured to extend in the control element at an axial end of the electromagnetic armature averted from the core; and
   an arrangement configured to delimit an axial movement of the movable unit away from the core of the electromagnetic actuator, the arrangement comprising at least one hook arranged on and being formed integrally with the connection housing part, the at least one hook being configured to engage into the radial recess of the movable unit.

2. The electromagnetic valve as recited in claim 1, wherein,
   the connection housing part comprises a retaining element which comprises a radial inner edge, and
   the at least one hook is configured to extend from the radial inner edge.

3. The electromagnetic valve as recited in claim 1, wherein,
   the housing comprises a circumference,
   the at least one hook is provided as three hooks, and
   the three hooks are each formed on the housing and are evenly distributed over the circumference thereof.

4. The electromagnetic valve as recited in claim 3, further comprising:
   a spring; and
   ring segment-shaped protrusions which comprises gaps, the ring segment-shaped protrusions being configured to serve as a guiding section for the spring;

wherein,
each retaining element of the three hooks is arranged in a respective gap of the ring segment-shaped protrusions so as to be evenly distributed.

5. The electromagnetic valve as recited in claim 1, wherein,
the at least one hook has an end;
the armature comprises a center axis and a radius, and
a radial distance of the end of the at least one hook to the center axis of the electromagnetic armature is less that the radius of the armature.

6. The electromagnetic valve as recited in claim 1, wherein,
an axial distance of the at least one hook from the core is at least as large as a distance of the axial end of the electromagnetic armature averted from the core in a position in which the control element rests on the valve seat in the assembled state of the electromagnetic valve.

7. The electromagnetic valve as recited in claim 6, wherein,
the radial recess comprises an axial height,
the electromagnetic armature further comprises a displacement path,
the at least one hook comprises an axial dimension, and
the axial height of the radial recess is at least as large as the displacement path of the electromagnetic armature when installed in the electromagnetic valve added to the axial dimension of the at least one hook and added to a distance of the at least one hook from the electromagnetic armature when the control element rests on the valve seat.

8. The electromagnetic valve as recited in claim 1, wherein,
the control element comprises an inner hollow body and a substantially cylindrical hollow body fastened thereto,
the inner hollow body comprises an axial section, and
the radial recess is formed in the axial section of the inner hollow body.

9. The electromagnetic valve as recited in claim 1, further comprising:
a spring; and
a guiding section for the spring, the guiding section comprising an axial end,
wherein,
the at least one hook is formed at the axial end of the guiding section.

* * * * *